United States Patent [19]
Morimoto et al.

[11] Patent Number: 5,219,648
[45] Date of Patent: Jun. 15, 1993

[54] STAMPABLE SHEET SHAPED-PRODUCT, PROCESS FOR PRODUCING THE SAME, AND USE OF THE SAME AS SOUND-ABSORBING AND HEAT-INSULATING MATERIAL

[75] Inventors: Kiyotake Morimoto; Yasuo Imashiro; Takahiko Matsumoto, all of Tokyo, Japan

[73] Assignee: Nisshinbo Industries, Inc., Tokyo, Japan

[21] Appl. No.: 806,398

[22] Filed: Dec. 13, 1991

[30] Foreign Application Priority Data

Dec. 14, 1990 [JP] Japan ................ 2-410946

[51] Int. Cl.$^5$ .............................. B32B 3/26
[52] U.S. Cl. .................. 428/316.6; 428/308.4; 427/373; 427/393.5
[58] Field of Search ............... 428/308.4, 316.6; 427/373, 393.5

[56] References Cited

U.S. PATENT DOCUMENTS 4,452,829  6/1984  Smith ........................ 427/209

Primary Examiner—George F. Lesmes
Assistant Examiner—Chris Raimund
Attorney, Agent, or Firm—Shea & Gould

[57] ABSTRACT

A stampable sheet shaped-product has a skin layer consisting essentially of a foamable thermosetting resin and formed on and in one or both of surfaces of a sheet-like open cell plastic foam. Optionally, a facing material layer of a proper material may be formed on one or both of surfaces of the skin layer. Such stampable sheet shaped-product is produced by applying a composition consisting essentially of a foamable thermosetting resin onto one or both of surfaces of a sheet-like open cell plastic foam, so that the one or both surfaces is or are impregnated with the composition. Optionally, a proper facing material is placed on one or both of the surfaces, and the resulting material is subjected to a hot pressing. Alternatively, the stampable sheet shaped-product may be produced by a process including a thermal treatment step interposed between the above-described applying and hot-pressing steps.

7 Claims, 1 Drawing Sheet

STAMPABLE SHEET SHAPED-PRODUCT, PROCESS FOR PRODUCING THE SAME, AND USE OF THE SAME AS SOUND-ABSORBING AND HEAT-INSULATING MATERIAL

BACKGROUND OF THE INVENTION

1. Field of the Invention

The present invention relates to a stampable sheet shaped-product which can be shaped into various configurations and which is more lightweight than the prior art products, and a process for producing the same, as well as use of the same as a sound-absorbing and heat-insulating material.

2. Description of the Prior Art

The stampable sheet shaped-products have been used primarily as a sound-absorbing and heat-insulating material, generally in the fields of building materials, automobiles and pipings. The inventors of the present invention have proposed, in Japanese Patent Application Laid-open No. 146615/87, a stampable sheet shaped-product which has a heat resistance superior to the prior art product and which is produced by hot pressing process, i.e., a stampable sheet shaped-product which is produced by applying polycarbodiimide resin to a mat-like glass fiber to given thickness and subjecting the resulting material to hot pressing.

However, when a glass mat and a felt are used in the prior art, it is necessary for the usable glass fiber to have a bulk density of 100 kg/m$^3$ or more and for the usable felt to have a bulk density of 300 kg/m$^3$ or more, for example, for the purpose of maintaining a shape required for handling in a shaping operation. Therefore, a further reduction in weight has been desired.

SUMMARY OF THE INVENTION

Accordingly, it is an object of the present invention to provide a stampable sheet shaped-product which is more lightweight than the prior art product, and a process for producing the same, as well as a sound-absorbing and heat-insulating material comprising such a stampable sheet shaped-product.

To achieve the above object, according to the present invention, there is provided a stampable sheet shaped-product comprising a sheet-like open cell plastic foam having a skin layer consisting essentially of a foamable thermosetting resin on one or both of surfaces.

In addition, according to the present invention, there is provided a process for producing a stampable sheet shaped-product, comprising the steps of applying a composition consisting essentially of a foamable thermosetting resin onto one or both surfaces of a sheet-like open cell plastic foam, so that the one or both surfaces is or are impregnated with the composition, and subjecting the impregnated plastic foam to hot pressing. There is also provided a process for producing a stampable sheet shaped-product, comprising the steps of applying a composition consisting essentially of a foamable thermosetting resin onto one or both surfaces of a sheet-like open cell plastic foam, so that the one or both surfaces is or are impregnated with the composition, subjecting the impregnated plastic foam to thermal treatment, and subjecting the resulting material to hot pressing.

Further, according to the present invention, there is provided a sound-absorbing and heat insulating material comprising a stampable sheet shaped-product comprising a sheet-like open cell plastic foam having a skin layer consisting essentially of a foamable thermosetting resin on one or both surfaces.

As used herein, the term "sound-absorbing and heat-insulating material" means a material used for sound absorption, or heat insulation or both of sound absorption and heat insulation.

The polycarbodiimide resin used in the present invention is foamable and is subjected to a shaping while being foamed. Therefore, cells in the plastic foam used as a core material cannot be closed, and the resulting shaped product has an increased sound-absorbing effect. In the prior art phenol-impregnated felt shaped-product, the heat resistance thereof is determined by the heat resistance of the phenol and there is a tendency to a reduction in heat resistance of the shaped product. However, the polycarbodiimide resin used in the present invention is a thermosetting resin which is started to be thermally decomposed at 350° C., and a stampable sheet shaped product having an excellent heat resistance can be formed by using a heat resistant plastic foam, e.g., a melamine foam or a silicone foam as a core material. In addition, the stampable sheet shaped product of the present invention would not be burned in a normal condition. Further, the polycarbodiimide resin itself is self-extinguishing and therefore, it is possible to produce a stampable sheet shaped-product having a self-extinguishing property by integrally shaping a non-flammable or self-extinguishing plastic foam, e.g., a melamine foam or a silicone foam, or a flame-retarded facing material.

The stampable sheet shaped-product produced in this manner can be used at a place requiring a flame retardance, e.g., a building material and an interior material; at a place requiring a heat resistance, e.g., an inner wall of an engine room or a ceiling of an automobile; or in an industrial machinery such as a motor and a generator.

DETAILED DESCRIPTION OF THE INVENTION

The present invention will now be described in detail.

The present invention uses a sheet-like open-cell plastic foam in place of a glass fiber which has been used for a prior art product, as described above. Examples of such sheet-like open-cell plastic foams include open-cell plastic foams shapable by hot pressing, such as polyurethane, silicone and melamine foams. The bulk density thereof may be in a range of 8 to 100 Kg/m$^3$, preferably 8 to 50 Kg/m$^3$.

A skin layer consisting essentially of a foamable thermosetting resin is provided on and in a surface of the sheet-like open-cell plastic foam. This skin layer may be provided on one or both surfaces of the sheet-like plastic foam. As can be seen from a process for producing a stampable sheet shaped-product according to the present invention, the skin layer is formed by applying a composition consisting essentially of a foamable thermosetting resin onto the surface of the sheet-like open-cell plastic foam, so that the surface of the plastic foam is impregnated with the composition, and subjecting the impregnated plastic foam to a hot pressing process. Therefore, the skin layer forms a surface layer and is deposited in a partially incorporated manner by incorporation of a portion of the skin layer into the sheet-like open-cell plastic foam.

Optionally, a facing material layer may be provided on the skin layer for the purpose of providing increases in aesthetic value, radiation effect and strength. The facing material layer may be provided on one or both surfaces of the skin layer, or may be not provided, if desired. The facing material layer may be formed from a material such as a flame-retarded polyester non-woven fabric, an aluminum foil, 20 to 50µ glass cloth, a chopped-strand mat, an aluminum deposited non-woven fabric, and the like.

An example of the foamable thermosetting resin is a polycarbodiimide resin which is described in detail in the above-described Japanese Patent Application Laid-open No. 146615/87.

More specifically, the polycarbodiimide resin may be produced from one or more organic polyisocyanates, one or more cross-linking agents having two or more active hydrogen atoms in a molecule, and one or more catalysts for promoting the carbodiimidization of the isocyanates. The organic polyisocyanates include, for example, 2,4-tolylene diisocyanate, 2,6-tolylene diisocyanate, crude tolylene diisocyanate, methylene diphenyl-diisocyanates and the like. The cross-linking agents having two or more active hydrogen atoms in a molecule include triazine derivatives, cyanuric acid and the derivatives thereof, hydroquinone and the like. The catalysts for promoting the carbodiimidization of the isocyanates include 1-phenyl-2-phosphorene-1-oxide, 3-methyl-2-phosphorene-1-oxide, 1-phenyl-2-phosphorene-1-sulfide and the like. Other aspects of the polycarbodiimide resin such as the ability to use a prepolymer therefor are described in detail in the above-described Japanese Patent Application Laid-open No. 146615/87 and hence, the description thereof is omitted herein.

The stampable sheet-like shaped-product may be made in a process of the present invention which will be described below.

First, a composition containing an uncured foamable thermosetting resin, e.g., a solution containing an uncured polycarbodiimide resin as described above is prepared. The foamable thermosetting resin composition is applied onto one or both surfaces of the sheet-like open cell plastic foam, so that the one or both surfaces is or are impregnated with the resin. In this case, the amount of the composition containing the foamable thermosetting resin may be, for example, in a range of 50 to 500 g/m$^2$, preferably 100 to 350 g/m$^2$.

Then, the sheet-like open cell plastic foam impregnated with the foamable thermosetting resin is subjected to a hot pressing. The temperature of this hot pressing may be, for example, in a range of 150° to 250° C., preferably 180° to 230 ° C., and the time of the hot pressing may be, for example, in a range of 30 to 150 seconds. It should be noted that if the sheet-like open cell plastic foam impregnated with the foamable thermosetting resin, after placing of a facing material thereon, is subjected to a hot pressing, a stampable sheet shaped-product having a facing material layer can be provided.

In either case, the sheet-like open cell plastic foam impregnated with the foamable thermosetting resin may be subjected to a pre-treatment (precuring) and then to a hot pressing (postcuring), if desired. In such case, conditions for the pre-treatment may be such that the temperature of the thermal treatment is in a range of 90° to 120° C., and the time of the thermal treatment is in a range of 60 to 120 minutes.

The stampable sheet shaped-product made in the above manner according to the present invention may be subjected to a secondary fabrication in a well-known manner such as a cutting around its outer periphery, a punching or a slitting.

The thus-obtained stampable sheet shaped product of the present invention exhibits a good sound-absorbing property and/or a heat insulating property and therefore, can be effectively used as a sound-absorbing material, a heat insulating material, or a sound-absorbing and heat-insulating material in the fields of building materials, automobiles and pipings.

EXAMPLES

The present invention will now be described by way of examples in connection with the accompanying drawings.

EXAMPLE 1

Figure 1:
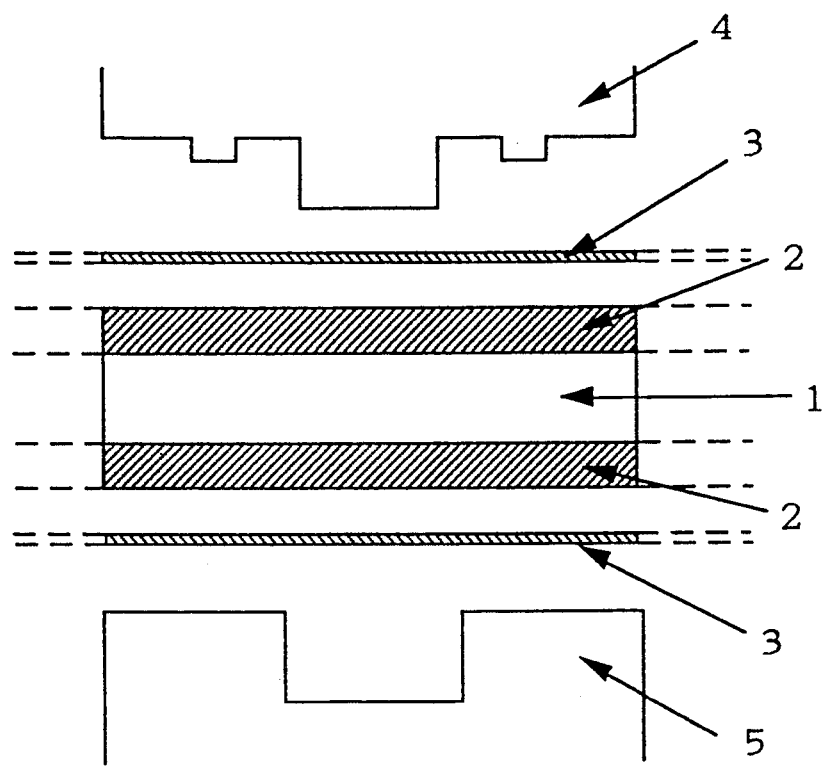
FIG. 1 is a side view for illustrating the production of a stampable sheet shaped-product of the present invention by pressing.

In FIG. 1, reference numeral 1 indicates an open cell melamine foam which is incapable of being shaped alone, and in this Example, Basotect (Trademark) made by BASF Aktiengesellschaft was used and this foam has a bulk density of 11 kg/m$^3$ and a flame retardance.

An uncured foamable thermosetting resin was applied onto a surface of the melamine foam 1. The resin used in this example is a composition which will be described below (this composition is referred to as "a carbodiimide resin" hereinafter).

| | |
|---|---|
| MDI (made by MD Kasei Co., Ltd.) | 100 parts |
| 2,4,6-triamino-1,3,5-triazine | 15 parts |
| silicone-based surfactant | 0.2 parts |
| 3-methyl-1-phenylphosphorene oxide | 0.1 parts |
| carbon black | 0.2 parts |

The polycarbodiimide resin 2 was uniformly applied onto the surface of the melamine foam 1 in an amount of 150 g/m$^2$ per surface, so that the surface was impregnated therewith. In FIG. 1, the opposite surfaces of the melamine foam 1 were also impregnated with the polycarbodiimide resin 2, but only one surface of the melamine foam 1 may be impregnated with the polycarbodiimide resin 2.

The melamine foam 1 obtained immediately after application of the polycarbodiimide resin 2, or the melamine foam material 1 precured for 80 minutes at 100° C. immediately after application of the polycarbodiimide resin 2 can be utilized as a sheet material which has a stability for preservation for 20 to 30 days and is deformable by hot-pressing.

A polyester non-woven fabric having a weight of 50 g/m$^2$ was laminated as a facing material 3 onto the melamine foam material 1 deformable by hot pressing. The sheet resulting from lamination of the facing material 3 to the melamine foam material 1 was placed between an upper die 4 and a lower die 5 both heated to 200° C. and subjected to a hot pressing for 60 seconds. In this manner, one example of a stampable sheet shaped-product of the present invention shown in FIG. 2 was produced by integral shaping of the melamine foam material 1 with the facing material 3 while foaming the foamable thermosetting polycarbodiimide resin 2.

The obtained stampable sheet-shaped product was subjected to a tensile test defined in JISK-6854. The result showed that the foam material was broken, and the peel-off of the facing material 3 bonded to the resin was not observed. This is because the polycarbodiimide resin 2 provides a shapability to the melamine foam 1 and at the same time, enables a bonding with the facing material 3.

Figure 2:
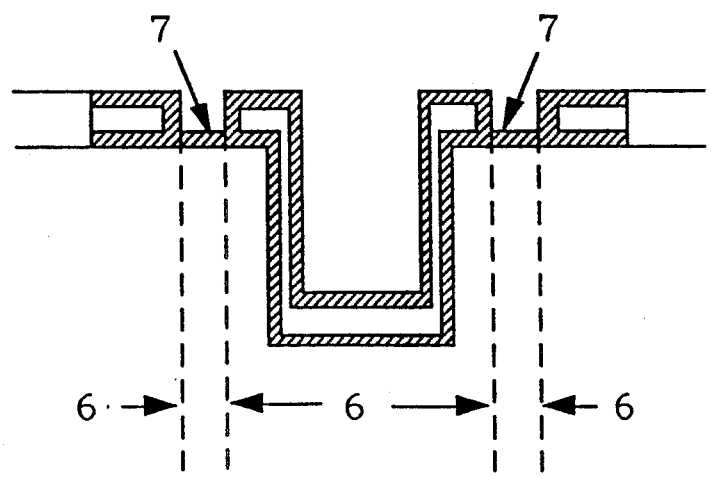
FIG. 2 is a sectional view of a shaped-product made by a producing process shown in FIG. 1.

In FIG. 2, reference numeral 6 indicates a portion of the melamine foam 1, only the skin layer of which is impregnated with the polycarbodiimide resin 2, i.e., a portion in which the sound-absorbing and heat-insulating properties possessed by the melamine foam 1 having the sam thickness as that before shaping is further improved by the foamable polycarbodiimide resin 2, and reference numeral 7 indicates a drawn portion of the melamine foam 1, i.e., a portion which exhibits a strength due to the impregnation of the entire melamine foam 1 with the polycarbodiimide resin 2 and has a thickness of 2 mm as a result of pressing of the 20 mm thick melamine foam 1.

One example of a stampable sheet shaped-product of the present invention provided in this manner can be easily cut around its outer periphery, punched or slit. After such processing, a hydrothermal cycle test was carried out three times for the stampable sheet shaped-product, and the result showed that no variation in surface condition, rigidity and size was observed. One cycle of the hydrothermal cycle test was for 7 hours in water, for 7.5 hours at 120° C. and for 7.5 hours at −30° C.

EXAMPLE 2

Stampable sheet shaped-products were produced in the same manner as in Example 1, except for the use of various amounts of the polycarbodiimide resin, various thicknesses of the melamine foam and various types of the facing materials, and were subjected to a test for estimation, together with a comparative example.

First, the following stampable sheet shaped-products A, B and C were formed by the same hot pressing for 120 seconds at 180° C. as in Example 1.

(A) A stampable sheet shaped-product (free of a facing material) having a thickness of 10 mm which was produced by applying the polycarbodiimide resin to both surfaces of the melamine foam having a bulk density of 11 kg/m$^3$ and a thickness of 10 mm, in an amount of 150 g/m$^2$ per surface and then subjecting the resulting material to a hot pressing.

(B) A stampable sheet shaped-product having a thickness of 10 mm which was produced by integrally pressing a polyester non-woven fabric having a weight of 50 g/m$^2$ as a facing material on both surfaces of the above stampable sheet shaped-product A.

(C) A stampable sheet shaped-product having a thickness of 10 mm which was produced by applying the polycarbodiimide resin to both surfaces of the melamine foam having a bulk density of 11 kg/m$^3$ and a thickness of 10 mm, in an amount of 200 g/m$^2$ per surface and then integrally pressing a polyester non-woven fabric having a weight of 50 g/m$^2$ as a facing material on both surfaces of the resulting material.

Then, a melamine foam (a) having a bulk density of 11 kg/m$^3$ and a thickness of 10 mm was prepared as a comparative example. The stampable sheet shaped-products A, B and C and the comparative example, i.e., the melamine foam (a) were subjected to a tensile test using a dumb-bell No. 1 according to JISK-6301 to give results shown in Table 1.

TABLE 1

| Sample No | Elongation (%) | Tensile strength (kgf/cm$^2$) | Young's modulus (kgf/cm$^2$) |
|---|---|---|---|
| A | 3.1 | 0.9 | 32.3 |
| B | 14.3 | 7.3 | 119.4 |
| C | 5.6 | 8.7 | 163.7 |
| a | 19.7 | 1.0 | 8.2 |

As can be seen from the results given in Table 1, the stampable sheet-shaped product A derived from the melamine foam having the both surfaces impregnated with the polycarbodiimide resin in the amount of 150 g/m$^2$ has an increased Young's modulus and an excellent rigidity, and the stampable sheet shaped-product B resulting from the integral pressing of the polyester non-woven fabric as a facing material has a further increased rigidity and hence, the rigidity is further improved by an increase in the amount of the resin as for the stampable sheet shaped-product C.

EXAMPLE 3

The following stampable sheet shaped-products were fabricated in the same pressing process as in Example 1.

Stampable sheet shaped-products (b) made by use of a glass mat having a thickness of 8 mm
   b-1 : through application of the resin in an amount of 100 g/m$^2$ per surface
   b-2 : through application of the resin in an amount of 150 g/m$^2$ per surface
   b-3 : through application of the resin in an amount of 200 g/m$^2$ per surface Stampable sheet shaped-products (D) made by use of a melamine foam having a thickness of 8 mm
   D-1 : through application of the resin in an amount of 100 g/m$^2$ per surface
   D-2 : through application of the resin in an amount of 150 g/m$^2$ per surface
   D-3 : through application of the resin in an amount of 200 g/m$^2$ per surface Stampable sheet shaped-products (E) made by use of a soft urethane having a thickness of 8 mm
   E-1 : through application of the resin in an amount of 100 g/m$^2$ per surface
   E-2 : through application of the resin in an amount of 150 g/m$^2$ per surface
   E-3 : through application of the resin in an amount of 200 g/m$^2$ per surface Stampable sheet shaped-products (c) made by use of a glass mat having a thickness of 20 mm
   c-1 : through application of the resin in an amount of 100 g/m$^2$ per surface
   c-2 : through application of the resin in an amount of 150 g/m$^2$ per surface
   c-3 : through application of the resin in an amount of 200 g/m$^2$ per surface Stampable sheet shaped-products (F) made by use of a melamine foam having a thickness of 20 mm
   F-1 : through application of the resin in an amount of 100 g/m$^2$ per surface
   F-2 : through application of the resin in an amount of 150 g/m$^2$ per surface
   F-3 : through application of the resin in an amount of 200 g/m$^2$ per surface Stampable sheet shaped-products (G) made by use of a soft urethane having a thickness of 20 mm G-1 : through application of the resin in an amount of 100 g/m² per surface G-2 : through application of the resin in an amount of 150 g/m² per surface G-3 : through application of the resin in an amount of 200 g/m² per surface The glass mat, the melamine foam and the soft urethane have bulk densities of 100 kg/m³, 11 kg/m³ and 14 kg/m³, respectively, and in any of the stampable sheet shaped-products, a non-woven fabric having a weight of 50 g/m² was used as a facing material on both surfaces. The stampable sheet shaped-products produced in this manner were measured for the apparent specific gravity (the weight/volume of the product) and the weight. The results are given in Table 2.

TABLE 2

| Sample No. | Apparent specific gravity (kg/m³) | Weight (g/m²) |
|---|---|---|
| b-1 | 139 | 1,110 |
| b-2 | 152 | 1,212 |
| b-3 | 165 | 1,318 |
| D-1 | 50 | 400 |
| D-2 | 62 | 496 |
| D-3 | 75 | 598 |
| E-1 | 53 | 418 |
| E-2 | 66 | 512 |
| E-3 | 79 | 613 |
| c-1 | 120 | 2,400 |
| c-2 | 131 | 2,620 |
| c-3 | 138 | 2,740 |
| F-1 | 27 | 540 |
| F-2 | 31 | 620 |
| F-3 | 37 | 740 |
| G-1 | 30 | 600 |
| G-2 | 34 | 680 |
| G-3 | 40 | 800 | used Stampable sheet shaped-products (H) produced by use of a melamine foam having a thickness of 15 mm H-1 : through application of the resin in an amount of 100 g/m² per surface H-2 : through application of the resin in an amount of 150 g/m² per surface H-3 : through application of the resin in an amount of 200 g/m² per surface Sound-absorbing and heat-insulating material (d) which is a soft urethane having a thickness of 8 mm Sound-absorbing and heat-insulating material (e) which is a soft urethane having a thickness of 20 mm Sound-absorbing and heat-insulating material (f) which is a melamine foam having a thickness of 8 mm Sound-absorbing and heat-insulating material (g) which is a melamine foam having a thickness of 20 mm Sound-absorbing and heat-insulating material (h) made by use of a glass mat having a thickness of 15 mm through application of the resin in an amount of 150 g/m² per surface Sound-absorbing and heat-insulating material (i) which is a felt impregnated with phenol and having a thickness of 15 mm The glass mat, the melamine foam and the soft urethane have bulk densities of 100 kg/m³, 11 kg/m³ and 14 kg/m³, respectively, and in the stampable shaped-products (H and h), a non-woven fabric having a weight of 50 g/m² was used as a facing material on both surfaces thereof. The thus-produced stampable shaped-products, after formation of an air layer of 10 mm on a back thereof, were measured for the direct projection sound absorbing coefficient. The results are given in Table 3.

TABLE 3

| Frequency (Hz) | d | e | f | g | D-4 | F-4 | E-4 | G-4 | h | i | H-1 | H-2 | H-3 |
|---|---|---|---|---|---|---|---|---|---|---|---|---|---|
| 100 | | | | | | 6.2 | | | | | | | |
| 125 | | | | | | 8.1 | | | | | | 7.1 | 6.7 |
| 160 | | | | | | 7.1 | | | | | | 7.9 | 7.2 |
| 200 | | | | | | 8.5 | | | | | 6.7 | 8.1 | 8.7 | 8.6 |
| 250 | | | | | | 13.8 | | | | 6.2 | 8.3 | 10.1 | 10.6 | 9.8 |
| 315 | | 7.7 | | 8.4 | 6.2 | 21.7 | | 7.6 | 9.1 | 12.1 | 13.3 | 13.7 | 13.2 |
| 400 | 6.2 | 11.0 | 6.9 | 12.5 | 7.5 | 37.0 | | 9.1 | 8.8 | 17.4 | 13.3 | 17.1 | 19.4 |
| 500 | 6.5 | 13.2 | 8.0 | 16.8 | 14.0 | 39.7 | | 10.9 | 20.0 | 23.8 | 17.8 | 25.5 | 28.1 |
| 630 | 6.9 | 14.7 | 10.3 | 23.7 | 21.9 | 58.9 | | 13.7 | 30.4 | 32.9 | 39.7 | 40.8 | 42.5 |
| 800 | 6.9 | 20.0 | 13.2 | 29.5 | 33.4 | 90.6 | 8.8 | 19.7 | 41.7 | 39.6 | 61.0 | 82.6 | 95.5 |
| 1000 | 10.1 | 26.7 | 16.4 | 42.7 | 61.9 | 98.1 | 12.9 | 29.1 | 58.7 | 60.8 | 82.0 | 92.5 | 76.9 |
| 1250 | 11.5 | 34.6 | 19.3 | 51.5 | 83.5 | 91.6 | 16.2 | 37.2 | 61.8 | 74.4 | 90.0 | 79.4 | 69.5 |
| 1600 | 13.5 | 39.4 | 23.7 | 61.9 | 99.3 | 76.0 | 22.6 | 50.5 | 78.6 | 89.0 | 96.9 | 73.0 | 39.6 |
| 2000 | 15.1 | 41.5 | 27.0 | 67.7 | 96.1 | 66.4 | 31.6 | 58.7 | 80.9 | 96.4 | 92.0 | 62.8 | 29.2 |
| 2500 | 16.8 | 47.0 | 29.0 | 76.5 | 93.6 | 59.3 | 40.0 | 72.2 | 86.1 | 98.2 | 74.4 | 38.0 | 20.6 |
| 3150 | 28.6 | 57.4 | 44.9 | 83.7 | 81.5 | 49.6 | 61.2 | 70.6 | 97.4 | 94.6 | 68.2 | 36.1 | 16.4 |
| 4000 | 42.3 | 58.5 | 64.9 | 87.8 | 52.5 | 43.0 | 76.2 | 66.2 | 91.9 | 77.8 | 61.8 | 33.4 | 14.1 |
| 5000 | 40.3 | 51.7 | 58.6 | 81.3 | 51.3 | 39.7 | 80.0 | 59.4 | 90.3 | 65.6 | 54.5 | 32.0 | 12.5 |

EXAMPLE 4

The following stampable sheet shaped-products were fabricated in the same pressing process as in Example 1.

Stampable sheet shaped-product (D-4) similar to the stampable sheet shaped-product (D-1) but with no facing material used Stampable sheet shaped-product (F-4) similar to the stampable sheet shaped-product (F-1) but with no facing material used Stampable sheet shaped-product (E-4) similar to the stampable sheet shaped-product (E-1) but with no facing material used Stampable sheet shaped-product (G-4) similar to the stampable sheet shaped-product (G-1) but with no facing material It can be seen from Table 3 that the melamine foams (f) and (g) are lightweight and excellent in sound-absorbing property. The stampable sheet shaped-products (D-4) and (F-4) of the present invention produced by use of the melamine foams (f) and (g) as a core material have a further increased sound-absorbing property. It is believed that this is because the foamable thermosetting polycarbodiimide resin providing a moldablity in the present invention was subjected to the hot pressing while being foamed, without closing the cells in the resulting plastic foam, leading to an improved sound absorbing property.

With an increase in thickness, the sound-absorption frequency region is widened and the sound absorbing property at a frequency in a range of 500 to 2,000 Hz is improved, as is the case with the common sound-absorbing material. In addition, as apparent from comparison of the stampable sheet shaped-products (H-1, H-2 and H-3) with the stampable sheet shaped-product (i), the stampable sheet shaped-products (H-1, H-2 and H-3) are higher in maximum sound-absorbing coefficient at a lower frequency than the phenol felt shaped-product (i) and the stampable shaped-product (h) produced by use of the glass mat as a core material, which are prior art products and have the same thickness.

EXAMPLE 5

There were prepared the stampable sheet shaped-product (B) described in Example 2, the melamine foam having a thickness of 10 mm used as the comparative example (a) in Example 2, and the stampable sheet shaped-product (j) having a thickness of 10 mm produced by the same manner as the stampable sheet shaped-products (B) by use of the melamine foam (a) and a glass needle mat having a bulk density of 100 kg/m$^3$ and a thickness of 12 mm. These stampable sheet shaped-product (B and (i) and the comparative example (a) were measured for the heat conductivity by a planar plate comparison process according to JIS A-1412, and the results are given in Table 4.

TABLE 4

| Sample No. | Bulk density (kg/m$^3$) | Heat conductivity (at 10° C.) (kcal/mh° C.) |
|---|---|---|
| (B) | 50 | 0.027 |
| (j) | 160 | 0.028 |
| (a) | 11 | 0.028 |

It can be seen from Table 4 that the stampable sheet shaped-product (B) made by application of the polycarbodiimide resin to the melamine foam (a), followed by integral pressing thereof together with the facing material has heat insulating property of the open cell plastic foam used as a core material which was effectively left therein. This is because the heat-insulating effect was increased without closing of cells in the plastic foam used as a core material, in the surface of the shaped-product. It can be also be seen that, as compared with the stampable sheet shaped-product (j) made by use of the glass mat having the equivalent thickness and heat conductivity, the stampable sheet shaped-product (B) has an apparent density equal to ⅓ thereof and is excellent in respect of the lightness.

EXAMPLE 6

A 10 mm×200 mm×200 mm piece of the stampable sheet shaped-product (B) described in Example 2 and a 10 mm×200 mm×200 mm piece of the comparative example (a) described in Example 2 were left to stand in a drier at 150° C. for 100 hours and 200 hours and then measured for the retentions of weight and size. The results in terms of a percentage calculated with the weight and size before leaving being 100% are given in Table 5.

TABLE 5

| Sample No. | Retention of weight (%) | | Retention of size (%) | |
|---|---|---|---|---|
| | after 100 hr. | after 200 hr. | after 100 hr. | after 200 hr. |
| (B) | 97.4 | 96.7 | 99.9 | 99.9 |
| (a) | 88.9 | 88.5 | 97.7 | 97.5 |

As given in Table 5, any large variation in both of weight and size was not observed in a long-term heat resistance test of the stampable sheet shaped-product (B) at 150° C.

What is claimed is:

1. A stampable sheet shaped-product comprising a sheet-like open cell plastic foam having a skin layer consisting essentially of a foamable thermosetting polycarbodiimide resin on and in one or both surfaces of the open cell plastic foam.

2. A stampable sheet shaped-product according to claim 1, wherein said skin layer is bonded in a partially incorporated manner to said sheet-like open cell plastic foam.

3. A stampable sheet shaped-product according to claim 1, wherein said sheet-like open cell plastic foam is a polyurethane foam, a silicone foam, or a melamine foam.

4. A process for producing a stampable sheet shaped-product, comprising the steps of;
    applying a composition consisting essentially of a foamable thermosetting polycarbodiimide resin onto one or both surfaces of a sheet-like open cell plastic foam, so that the one or both the surfaces is or are impregnated with the composition, and
    subjecting the impregnated plastic foam to a hot pressing.

5. A process for producing a stampable sheet shaped-product, comprising the steps of;
    applying a composition consisting essentially of a foamable thermosetting polycarbodiimide resin onto one or both of surfaces of a sheet-like open cell plastic foam, so that the one or both of the surfaces is or are impregnated with the composition,
    subjecting to the impregnated plastic foam to a thermal treatment, and
    subjecting the resulting material to a hot pressing.

6. A process for producing a stampable sheet shaped-product according to claim 4 or 5, wherein said sheet-like open cell plastic foam is a polyurethane foam, a silicone foam, or a melamine foam.

7. A sound-absorbing and heat-insulating material comprising a sheet-like open cell plastic foam having a skin layer consisting essentially of a foamable thermosetting carbodiimide resin on and in one or both of surfaces.

* * * * *